(12) United States Patent
Masuda et al.

(10) Patent No.: US 10,593,200 B2
(45) Date of Patent: Mar. 17, 2020

(54) TRAFFIC HINDRANCE RISK INDICATION APPARATUS

(71) Applicants: HONDA MOTOR CO., LTD., Tokyo (JP); JAPAN WEATHER ASSOCIATION, Tokyo (JP)

(72) Inventors: Takuro Masuda, Wako (JP); Kazuhiro Tanji, Tokyo (JP); Shigeyuki Nomura, Tokyo (JP)

(73) Assignees: HONDA MOTOR CO., LTD., Tokyo (JP); JAPAN WEATHER ASSOCIATION, Tokyo (JP)

( * ) Notice: Subject to any disclaimer, the term of this patent is extended or adjusted under 35 U.S.C. 154(b) by 171 days.

(21) Appl. No.: 15/713,923

(22) Filed: Sep. 25, 2017

(65) Prior Publication Data
US 2018/0089998 A1  Mar. 29, 2018

(30) Foreign Application Priority Data
Sep. 27, 2016  (JP) .................................. 2016-187709

(51) Int. Cl.
*G08G 1/01* (2006.01)
*G08G 1/09* (2006.01)
(Continued)

(52) U.S. Cl.
CPC ......... *G08G 1/093* (2013.01); *G01C 21/3691* (2013.01); *G01C 21/3694* (2013.01);
(Continued)

(58) Field of Classification Search
CPC .... G01C 21/3697; G08G 1/00; G08G 1/0104; G08G 1/096716; G08G 1/0133; G08G 1/0112
(Continued)

(56) References Cited

U.S. PATENT DOCUMENTS 7,050,903 B1 * 5/2006 Shutter .................. G08G 1/092
340/907
7,460,948 B2 * 12/2008 Van Buer ............. G08G 1/0104
701/117
(Continued)

FOREIGN PATENT DOCUMENTS

JP  2006-337182 A  12/2006
JP  5586195 B2  9/2014

*Primary Examiner* — Dalena Tran
(74) *Attorney, Agent, or Firm* — Squire Patton Boggs (US) LLP

(57) ABSTRACT

An apparatus for indicating a traffic hindrance risk, having a traffic hindrance information generating server that generates traffic hindrance information for links that define a driving route, and a weather information generating server that generates weather information from weather data distributed by a meteorological agency with respect to an area including the driving route. In the apparatus, a tabular data is generated together with congestion degree information by sorting foul weather information into a plurality of level categories in accordance with a degree of traffic hindrance when the weather information includes at least one item of foul weather information, and a traffic hindrance occurrence risk predictive value meaning possibility of traffic hindrance occurrence with respect to the driving route for a predetermined future period is calculated to be viewed by an operator of the vehicle.

18 Claims, 11 Drawing Sheets

(51) Int. Cl.
 *G08G 1/0967* (2006.01)
 *G01C 21/36* (2006.01)
 *G08G 1/065* (2006.01)

(52) U.S. Cl.
 CPC ......... *G08G 1/0112* (2013.01); *G08G 1/0129* (2013.01); *G08G 1/0133* (2013.01); *G08G 1/0141* (2013.01); *G08G 1/065* (2013.01); *G08G 1/096716* (2013.01); *G08G 1/096733* (2013.01)

(58) Field of Classification Search
 USPC ....... 701/23, 117–119, 532; 703/6; 382/173; 370/254–256; 340/905
 See application file for complete search history.

(56) References Cited

U.S. PATENT DOCUMENTS

| | | | |
|---|---|---|---|
| 7,899,611 B2* | 3/2011 | Downs | G08G 1/0104 701/117 |
| 9,349,285 B1* | 5/2016 | Fowe | G08G 1/00 |
| 2006/0287818 A1 | 12/2006 | Okude et al. | |
| 2013/0289865 A1* | 10/2013 | Miller | G08G 1/0104 701/119 |

* cited by examiner

FIG. 4

TRAFFIC HINDRANCE RISK UNDER FOUL WEATHER CONDITIONS ← → TRAFFIC HINDRANCE RISK

CONGESTION DEGREE BY PROBE →

| STATISTICAL CONGESTION DEGREE (STATISTICAL VALUES = AVERAGES) | SMOOTH (USUALLY SMOOTH) | | | HEAVY (USUALLY HEAVY) | | | JAMMED (USUALLY JAMMED) | | |
|---|---|---|---|---|---|---|---|---|---|
| CURRENT CONGESTION DEGREE (CURRENT/REAL TIME) | SMOOTH | HEAVY | JAMMED | SMOOTH | HEAVY | JAMMED | SMOOTH | HEAVY | JAMMED |
| CONGESTION DEGREE | 9 | 6 | 3 | 8 | 5 | 2 | 7 | 4 | 1 |
| | EQUALLY SMOOTH AS USUAL | SLIGHTLY HEAVIER THAN USUAL | FAIRLY JAMMED THAN USUAL | SLIGHTLY SMOOTHER THAN USUAL | EQUALLY HEAVY AS USUAL | SLIGHTLY JAMMED THAN USUAL | FAIRLY SMOOTHER THAN USUAL | SLIGHTLY SMOOTHER THAN USUAL | EQUALLY JAMMED AS USUAL |
| WEATHER CONDITION | STRAND RISK → | POSSIBILITY OF TRAFFIC HINDRANCE RISK → | TRAFFIC HINDRANCE RISK | | POSSIBILITY OF TRAFFIC HINDRANCE RISK → | TRAFFIC HINDRANCE RISK | | | TRAFFIC HINDRANCE RISK |
| 24HR SNOWFALL — NOT LESS THAN 20cm | STRAND RISK C | TRAFFIC HINDRANCE RISK C | TRAFFIC HINDRANCE RISK C | | TRAFFIC HINDRANCE RISK C | TRAFFIC HINDRANCE RISK C | | | TRAFFIC HINDRANCE RISK C |
| NOT LESS THAN 40cm | STRAND RISK B | TRAFFIC HINDRANCE RISK B | TRAFFIC HINDRANCE RISK B | | TRAFFIC HINDRANCE RISK B | TRAFFIC HINDRANCE RISK B | | | TRAFFIC HINDRANCE RISK B |
| NOT LESS THAN 60cm | STRAND RISK A | TRAFFIC HINDRANCE RISK A | TRAFFIC HINDRANCE RISK A | | TRAFFIC HINDRANCE RISK A | TRAFFIC HINDRANCE RISK A | | | TRAFFIC HINDRANCE RISK A |
| [SNOWSTORM] VISIBILITY — LESS THAN 200m | STRAND RISK C | TRAFFIC HINDRANCE RISK C | TRAFFIC HINDRANCE RISK C | | TRAFFIC HINDRANCE RISK C | TRAFFIC HINDRANCE RISK C | | | TRAFFIC HINDRANCE RISK C |
| LESS THAN 100m | STRAND RISK B | TRAFFIC HINDRANCE RISK B | TRAFFIC HINDRANCE RISK B | | TRAFFIC HINDRANCE RISK B | TRAFFIC HINDRANCE RISK B | | | TRAFFIC HINDRANCE RISK B |
| LESS THAN 50m | STRAND RISK A | TRAFFIC HINDRANCE RISK A | TRAFFIC HINDRANCE RISK A | | TRAFFIC HINDRANCE RISK A | TRAFFIC HINDRANCE RISK A | | | TRAFFIC HINDRANCE RISK A |
| [HEAVY RAIN] RAINFALL PER UNIT TIME — NOT LESS THAN 30mm | STRAND RISK C | TRAFFIC HINDRANCE RISK C | TRAFFIC HINDRANCE RISK C | | TRAFFIC HINDRANCE RISK C | TRAFFIC HINDRANCE RISK C | | | TRAFFIC HINDRANCE RISK C |
| NOT LESS THAN 50mm | STRAND RISK B | TRAFFIC HINDRANCE RISK B | TRAFFIC HINDRANCE RISK B | | TRAFFIC HINDRANCE RISK B | TRAFFIC HINDRANCE RISK B | | | TRAFFIC HINDRANCE RISK B |
| NOT LESS THAN 80mm | STRAND RISK A | TRAFFIC HINDRANCE RISK A | TRAFFIC HINDRANCE RISK A | | TRAFFIC HINDRANCE RISK A | TRAFFIC HINDRANCE RISK A | | | TRAFFIC HINDRANCE RISK A |

FIG. 6

| TIME | DRIVING SECTIONS : ●●~○○ | | | DRIVING SECTIONS ··· | | | |
|---|---|---|---|---|---|---|---|
| | SNOW-FALL | CON-GESTION | TRAFFIC HINDRANCE RANK | SNOW-FALL | CON-GESTION | TR HIND R | |
| 10:10 | 1cm/h | SMOOTH | RANK 0 | 1cm/h | SMOOTH | RA | ⎫ CURRENT |
| 10:20 | 4cm/h | HEAVY | RANK 1 | 2cm/h | HEAVY | RA | |
| 10:30 | 5cm/h | JAMMED | RANK 3 | 1cm/h | JAMMED | RA | ⎭ |
| 10:40 | 6cm/h | | RANK 3 | 0cm/h | | RA | ⎫ |
| 10:50 | 3cm/h | | RANK 2 | 2cm/h | | RA | |
| 11:00 | 2cm/h | | RANK 2 | 3cm/h | | RA | |
| 11:10 | 3cm/h | | RANK 2 | 1cm/h | | RA | |
| 11:20 | 4cm/h | | RANK 2 | 5cm/h | | RA | |
| 11:30 | 7cm/h | | RANK 3 | 0cm/h | | RA | |
| 11:40 | 3cm/h | | RANK 2 | 2cm/h | | RA | |
| 11:50 | 1cm/h | | RANK 1 | 6cm/h | | RA | PREDICTED |
| 12:00 | 1cm/h | | RANK 1 | 4cm/h | | RA | |
| 12:10 | 2cm/h | | RANK 2 | 2cm/h | | RA | |
| 12:20 | 3cm/h | | RANK 2 | 3cm/h | | RA | |
| 12:30 | 1cm/h | | RANK 1 | 1cm/h | | RA | |
| 12:40 | 0cm/h | | RANK 0 | 0cm/h | | RA | |
| 12:50 | 2cm/h | | RANK 2 | 2cm/h | | RA | |
| 13:00 | 4cm/h | | RANK 2 | 1cm/h | | RA | |
| 13:10 | 5cm/h | | RANK 3 | 2cm/h | | RA | |
| 13:20 | 3cm/h | | RANK 2 | 0cm/h | | RA | |
| 13:30 | 1cm/h | | RANK 1 | 1cm/h | | RA | ⎭ |

FIG. 9

DRAW ALL TRAFFIC HINDRANCE RISKS
CONSTITUTING PREDETERMINED
DRIVING SECTIONS ON MESH MAP

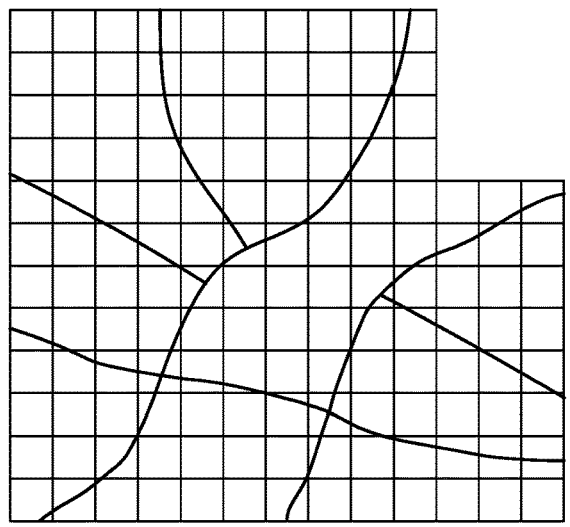

FIG. 10

COLOR NUMERICAL VALUES (4, 7 AND 8 ARE NOT COLORED
BECAUSE RISK OF TRAFFIC HINDRANCE OCCURRENCE IS
CONSIDERED LOW UNDER THE CURRENT CIRCUMSTANCES)

|  |  | CURRENT CONGESTION DEGREE | | |
|---|---|---|---|---|
|  |  | JAMMED | HEAVY | SMOOTH |
| STATISTICAL CONGESTION DEGREE | JAMMED | 1 | 4 | 7 |
|  | HEAVY | 2 | 5 | 8 |
|  | SMOOTH | 3 | 6 | 9 |

SHADE OF COLORS
→DARK : 3  MEDIUM : 2,6  LIGHT : 1,5,9

DELETE 4, 7, 8 FROM DRAWING OF FIG. 9, AND COLOR LINKS BY COLOR CORRESPONDING TO THE NUMERIC VALUES OF FIG. 10

COLOR REGION HAVING AT ITS SUMMIT SURFACE INCLUDING THE START POINT AND END POINT OF THE LINK CONCERNED IN COLOR CORRESPONDING TO THE NUMERIC VALUES OF FIG. 10

FIG. 13
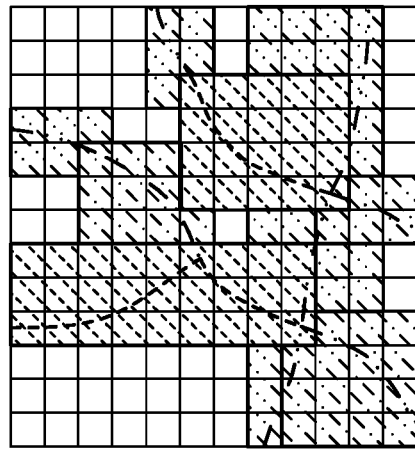
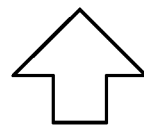
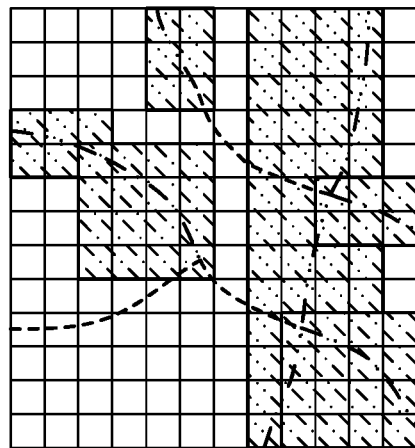
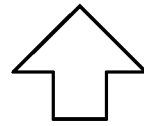
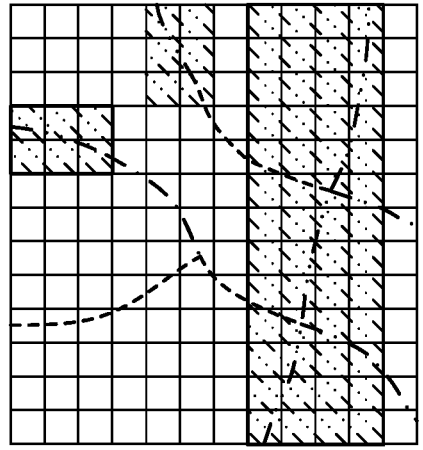
OVERWRITE NUMERIC VALUES OF MILDER CONGESTION DEGREES (IN ORDER OF 9, 5, 6, 1, 2, 3)

TRAFFIC HINDRANCE RISK INDICATION APPARATUS

CROSS-REFERENCE TO RELATED APPLICATION

This application is based upon and claims the benefit of priority from Japanese Patent Application No. 2016-187709 filed on Sep. 27, 2016, the contents of which are incorporated herein by reference.

BACKGROUND OF THE INVENTION

Field of the Invention

This invention relates to a traffic hindrance risk indication apparatus, particularly to an apparatus that indicates traffic hindrance risk predictive values calculated based on traffic information and weather information generated by a traffic hindrance information generating server and a weather information generating server.

Description of Related Art

As an example of an apparatus of this type can be cited that described in Japanese Patent No. 5,586,195. The technology set out in the reference is configured to acquire traffic information including at least either one of weather information and event information from a broadcasting facility by radio communication. Based on at least either one of the weather information and event information included in the traffic information, the technology is configured to determine as whether telematics information provided from a distribution server is to be downloaded, and when the determination is affirmative, the information is downloaded through a mobile communication network and a communication terminal.

The technology of the reference is configured to distribute cautioning information but does not go beyond this, and since it is not constituted to indicate predictive values of traffic hindrance risks that might be oncoming in view of traffic conditions and weather condition, it disadvantageously does not offer viewability and visibility to operators (users).

SUMMARY OF THE INVENTION

Therefore, an object of this invention is to overcome the aforesaid problem by providing a traffic hindrance risk indication apparatus configured to indicate predictive values of traffic hindrance occurrence risks based on traffic hindrance information meaning congestion degree acquired from driving data transmitted from vehicles.

In order to achieve the object, this invention provides in its first aspect an apparatus for indicating a traffic hindrance risk, comprising: a traffic hindrance information generating server configured to generate traffic hindrance information for links that define a driving route on a mesh map, the traffic hindrance information encompassing congestion degree information including a current congestion degree obtained from a current value of driving data transmitted as probe data regarding the driving route from a vehicle equipped with a navigation system and a statistical congestion degree obtained from a statistical value of the current value of driving data in a certain previous period, the congestion degree information being sorted into a plurality of level categories in accordance with a driving speed in the driving data; a weather information generating server configured to generate weather information from weather data distributed by a meteorological agency with respect to an area including the driving route based on an weather model; a data generating unit configured to generate a tabular data together with the congestion degree information sorted into the plurality of level categories by sorting, when the weather information includes at least one item of foul weather information among snow, rain and visibility, the foul weather information into a plurality of level categories in accordance with a degree of traffic hindrance; and a traffic hindrance risk calculating unit configured to calculate a traffic hindrance occurrence risk predictive value meaning possibility of traffic hindrance occurrence with respect to the driving route for a predetermined future period based on the data generated by the data generating unit and indicate the traffic hindrance occurrence risk predictive value to be viewed by an operator of the vehicle.

In order to achieve the object, this invention provides in its second aspect an apparatus for indicating a traffic hindrance risk, comprising: a traffic hindrance information generating server configured to generate traffic hindrance information for links that define a driving route on a mesh map, the traffic hindrance information encompassing congestion degree information including a current congestion degree obtained from a current value of driving data transmitted as probe data regarding the driving route from a vehicle equipped with a navigation system and a statistical congestion degree obtained from a statistical value of the current value of driving data in a certain previous period, the congestion degree information being sorted into a plurality of level categories in accordance with a driving speed in the driving data; a weather information generating server configured to generate weather information from weather data distributed by a meteorological agency with respect to an area including the driving route based on an weather model; and at least one processor and a memory coupled to the processor; wherein the processor and the memory are configured to perform;

generating a tabular data together with the congestion degree information sorted into the plurality of level categories by sorting, when the weather information includes at least one item of foul weather information among snow, rain and visibility, the foul weather information into a plurality of level categories in accordance with a degree of traffic hindrance; and calculating a traffic hindrance occurrence risk predictive value meaning possibility of traffic hindrance occurrence with respect to the driving route for a predetermined future period based on the generated data and indicating the traffic hindrance occurrence risk predictive value to be viewed by an operator of the vehicle.

In order to achieve the object, this invention provides in its third aspect a method for indicating a traffic hindrance risk, having: a traffic hindrance information generating server configured to generate traffic hindrance information for links that define a driving route on a mesh map, the traffic hindrance information encompassing congestion degree information including a current congestion degree obtained from a current value of driving data transmitted as probe data regarding the driving route from a vehicle equipped with a navigation system and a statistical congestion degree obtained from a statistical value of the current value of driving data in a certain previous period, the congestion degree information being sorted into a plurality of level categories in accordance with a driving speed in the driving data; and a weather information generating server configured to generate weather information from weather data distributed by a meteorological agency with respect to an area including the driving route based on an weather model; comprising the steps of: generating a tabular data together with the congestion degree information sorted into the plurality of level categories by sorting, when the weather information includes at least one item of foul weather information among snow, rain and visibility, the foul weather information into a plurality of level categories in accordance with a degree of traffic hindrance; and calculating a traffic hindrance occurrence risk predictive value meaning possibility of traffic hindrance occurrence with respect to the driving route for a predetermined future period based on the generated data and indicating the traffic hindrance occurrence risk predictive value to be viewed by an operator of the vehicle.

BRIEF DESCRIPTION OF THE DRAWINGS

The objects, features, and advantages of the present invention will become clearer from the following description of embodiments in relation to the attached drawings, in which:

FIG. 4 is an explanatory diagram showing congestion degree information generated by the traffic hindrance information generating server of FIG. 1 and sent to the traffic hindrance risk indication apparatus;

FIG. 6 is an explanatory diagram for explaining operations (processing) of the traffic hindrance risk indication apparatus of FIG. 1 for predicting traffic hindrance occurrence risk defining possibility of traffic hindrance occurring during a predetermined future period;

FIG. 9 is an explanatory diagram for explaining processing of the flowchart of FIG. 8;

FIG. 10 is likewise a flowchart for explaining processing of the flowchart of FIG. 8;

FIG. 13 is likewise a flowchart for explaining processing of the flowchart of FIG. 8.

DETAILED DESCRIPTION OF THE INVENTION

An embodiment of the traffic hindrance risk indication apparatus according to this invention is explained with reference to the attached drawings in the following.

Figure 1:
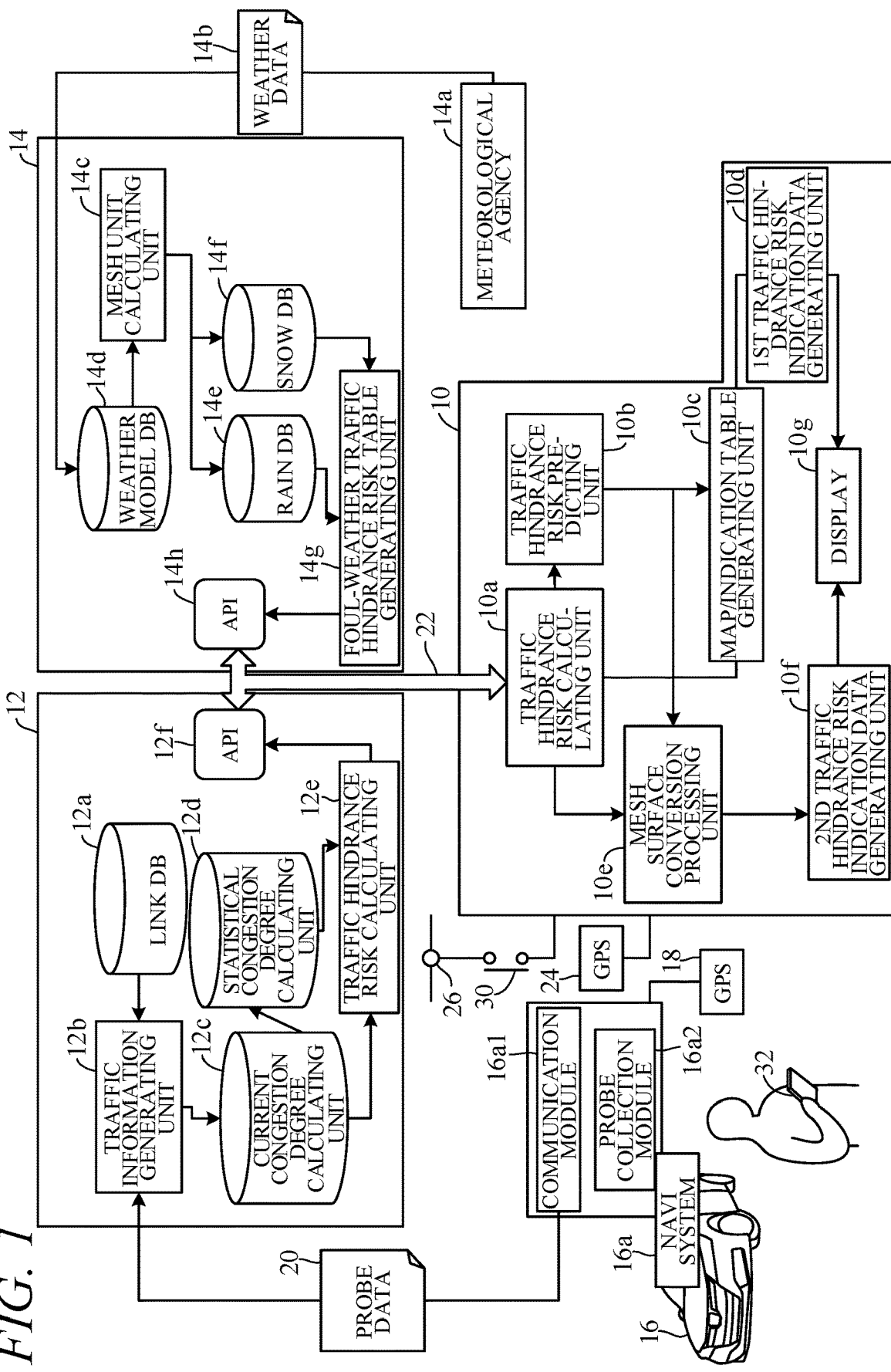
FIG. 1 is a schematic diagram generally illustrating a traffic hindrance risk indication apparatus in accordance with an embodiment of this invention.

FIG. 1 is a schematic diagram generally illustrating a traffic hindrance risk indication apparatus in accordance with an embodiment this invention.

Now to explain, symbol 10 designates the traffic hindrance risk indication apparatus (hereinafter called "apparatus 10"). The apparatus 10 comprises (has) one or more processors (CPUs) each equipped with a CPU, ROM, RAM, I/O and the like, and is connected to a traffic hindrance information generating server 12 and a weather information generating server 14.

The traffic hindrance information generating server 12 is constituted by a large-scale computer installed at a predetermined location (e.g., a facility owned by the present applicant).

The weather information generating server 14 is also similarly constituted by a large-scale computer installed at a predetermined location (e.g., a facility owned by the present applicant).

A communication-type navigation system (hereinafter called "navi system") 16a is installed in a vehicle(s) (i.e., floating car(s)) 16. When driving on a road, each of the vehicles 16 transmits probe data (i.e., floating car data; fcd or driving data) 20 through a communication module 16a1 and a probe collection module 16a2 built into the navi system 16a. The probe collection module 16a2 is equipped with a GPS unit 18 that receives position determination data from multiple GPS satellites and detects position of the vehicle 16.

The navi system 16a is constituted as a telematics-based drive support system operated as a membership system by the present applicant under the names Internavi and Internavi System (both registered trademarks).

Based on probe data 20 from drivers (members of the system) of a large numbers of system-equipped vehicles (only one vehicle shown) 16, driving conditions of the driving route are detected in the navi system 16a and the detected driving conditions are distributed on request to the member-driven vehicles 16 including the one concerned.

The traffic hindrance information generating server 12 receives driving data transmitted from vehicles 16 driving on the driving route as probe data 20, i.e., as driving data transmitted from the vehicles 16 regarding the driving route. By driving data is meant transmit time data, transmit position data, and the like.

The traffic hindrance information generating server 12 comprises a link (mapped data) DB (database) 12a, a traffic information generating unit 12b, a current congestion degree calculating unit 12c, a statistical congestion degree calculating unit 12d, a traffic hindrance risk calculating unit 12e, and an API (Application Program Interface) 12f.

The weather information generating server 14 receives weather data (including weather observation values, weather analysis values, and weather forecast values) 14b distributed by a meteorological agency (or agency related thereto) 14a. The weather information generating server 14 comprises a mesh unit calculating unit 14c, a weather model DB (database) 14d, a rain DB (database) 14e, a snow DB (database) 14f, a foul-weather traffic hindrance risk table generating unit 14g, and an API 14h.

As is well known, a "mesh" is a unit into which a region is divided lattice-like (e.g., primary mesh of approx. 80 km cell size, secondary mesh of approx. 10 km cell size, and tertiary mesh of 1 km cell size) and derivatively means data of various information within that range.

The processing performed by the mesh unit calculating unit 14c and the like enables the weather information generating server 14 to utilize the weather model stored in the weather model DB 14d to generate weather information from the weather data 14b distributed by the meteorological agency 14a with respect to an area including the driving route.

The apparatus 10 is connected to the traffic hindrance information generating server 12 and the weather information generating server 14 through a mobile telephone communication network, a public telephone communication network and other communication networks 22. The apparatus 10 comprises a traffic hindrance risk calculating unit 10a configured to calculate traffic hindrance risk in link units, a traffic hindrance risk predicting unit 10b configured to predict traffic hindrance risk based on calculated traffic hindrance risk, a map/indication table generating unit 10c, a first traffic hindrance risk indication data generating unit 10d configured to generate link-unit indication data of calculated traffic hindrance risks, a mesh surface conversion processing unit 10e configured to perform conversion-processing on a surface of a mesh map of traffic hindrance risks calculated by link units, a second traffic hindrance risk indication data generating unit 10f configured to generate indication data of traffic hindrance risk calculated in surface units, and a display 10g configured to display and indicate these data.

In the apparatus 10, the first traffic hindrance predicting unit 10b, mesh surface conversion processing unit 10e, second traffic hindrance risk indication data generating unit 10f and display 10g function as the data generating unit, and the traffic hindrance risk predicting unit 10b, first and second traffic hindrance risk indication data generating units 10d, 10f, and display 10g function as the traffic hindrance risk calculating unit.

Based on traffic information generated by the traffic hindrance information generating server 12 and weather information generated by the weather information generating server 14, the traffic hindrance risk calculating unit calculates and indicates with respect to driving routes traffic hindrance occurrence risk predictive values indicating possibility of traffic hindrance.

The apparatus 10 additionally comprises a GPS unit 24 that receives position determination data from multiple GPS satellites and detects position of the apparatus 10 itself and a switch 30 connected to a power supply 26, and the traffic hindrance risk predicting unit 10b is operated by an ON operation of the switch 30 by an operator (user) of the apparatus 10. In other words, the apparatus 10 is constituted as an independent apparatus complete in itself.

Therefore, an operator with the apparatus 10 on his or her person can drive the vehicle(s) 16 or other four-wheeled vehicle(s), a motorcycle(s) or a bicycle(s), or can walk while carrying the apparatus 10. Moreover, the apparatus 10 can be built into the navi system 16a or be built into a smartphone or other mobile terminal 32. When the apparatus 10 is built into a mobile terminal 32, it also becomes possible for an operator to drive the vehicle(s) 16 or the like with the mobile terminal 32 on his person.

When the apparatus 10 is built into the navi system 16a or the mobile terminal 32, analogous equipment of the navi system 16a or mobile terminal 32 serve in place of the GPS unit 24, power supply 26, switch 30, display 10g, and so on.

For convenience of explanation in the following, a case of the apparatus 10 being built into the navi system 16a is explained as an example.

Figure 2:
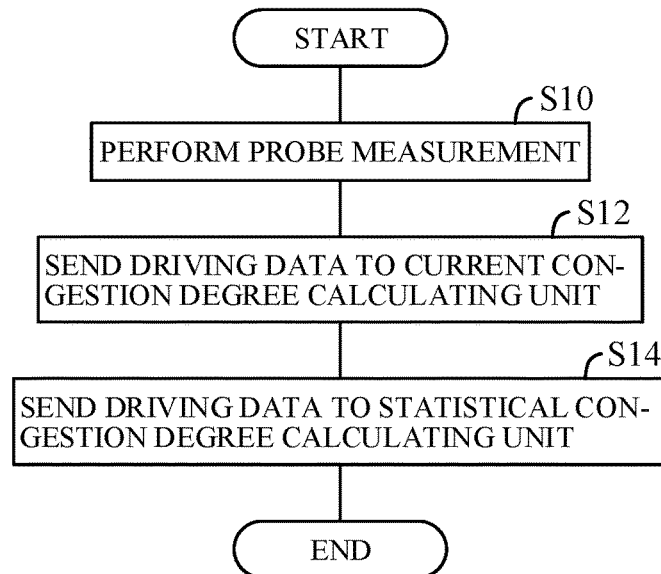
FIG. 2 is a flowchart showing operations (processing) of a traffic hindrance information generating server shown in FIG. 1.

Now follows a detailed explanation of operation of the traffic hindrance information generating server 12 and apparatus 10 with reference to, inter alia, the flowchart of FIG. 2.

FIG. 2 is a flowchart explaining operations (processing) of the traffic information generating unit 12b, current congestion degree calculating unit 12c, statistical congestion degree calculating unit 12d, etc. of the traffic hindrance information generating server 12.

Now to explain, probe measurement is performed first (S10 (S: processing Step)). Specifically, the traffic information generating unit 12b receives driving data transmitted from the vehicle(s) 16 regarding the driving route on which the vehicle(s) 16 is currently positioned as probe data 20, affixes a data generation date/time (date and time uploaded as probe data 20), and sends data to the current congestion degree calculating unit 12c together with the link corresponding to the driving route concerned stored in the link DB 12a. (S12).

The driving route (road) is represented by a series of links. Each link amounts to a vector connecting adjacent nodes (intersections, forks, or other points where multiple roads meet).

The current congestion degree calculating unit 12c detects the generation date/time of the received driving data and deems the driving data to be current values when determined to be within less than 30 min from current (present) time, compares them with multiple suitably set threshold values, and classifies the current values on the link concerned of the vehicle(s) 16 as smooth, heavy or jammed (calculates current congestion degree).

Further, when generation date/time of received driving data is determined to be 30 min or more from current time, the current congestion degree calculating unit 12c deems the driving data to be statistical values (aggregate values) and sends the driving data to the statistical congestion degree calculating unit 12d (S14).

The statistical congestion degree calculating unit 12d calculate driving time and average driving speed from start to end of the link concerned uses the received driving data to and compares the calculated average driving speed with multiple appropriately defined threshold values. Based on the comparison results and number of vehicle(s) 16 per unit time, the statistical congestion degree calculating unit 12d classifies average driving speed of vehicle(s) 16 on the link concerned as smooth, heavy or jammed (calculates statistical congestion degree). Statistical congestion degrees are aggregated by day of week and time of day. Thus the traffic information includes data generation time/date and congestion degree.

Figure 3:
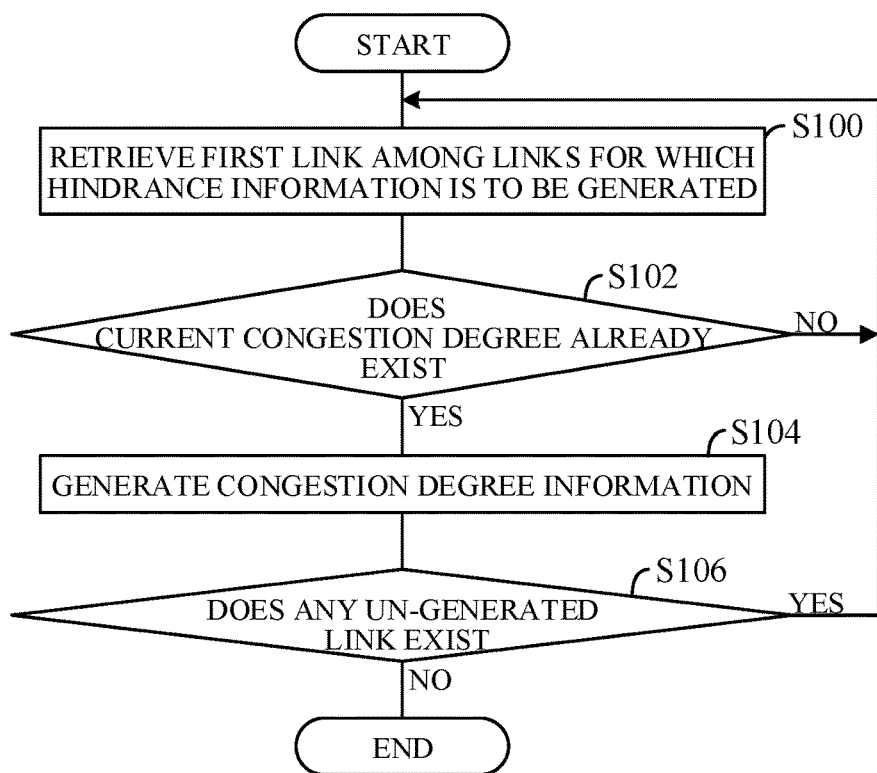
FIG. 3 is a similar flowchart showing operations (processing) of the traffic hindrance information generating server shown in FIG. 1.

FIG. 3 is a flowchart explaining operations of the traffic hindrance risk calculating unit 12e of the traffic hindrance information generating server 12.

Now to explain, first, in S100, a first link among links for which hindrance information is to be generated is retrieved. Actually, the traffic hindrance information generating server 12 generates congestion degree information comprising current congestion degree and statistical congestion degree for all of predetermined driving sections (e.g., 10 km sections) individually and starts by selecting the first (start side) link among the links constituting the driving sections.

Next, in S102, it is determined whether a current congestion degree already exists, namely whether one has been calculated.

When the result in S102 is NO, the program returns to S100 and the next link is selected, and when YES, goes to S104, in which congestion degree information comprising current congestion degree and statistical congestion degree is generated and indicated at an appropriate memory region.

Next, in S106, it is determined whether any un-generated link exists, and when the result is YES, the program repeats the aforesaid processing, and when NO, discontinues further processing. The reason for determining presence/absence of current congestion degree in S102 is that while statistical congestion degree is a value for a certain past period and naturally exists, there are cases in which no current congestion degree has yet been calculated.

Returning to explanation of FIG. 1, congestion degree information generated by the traffic hindrance information generating server 12 and weather information generated by the weather information generating server 14 by applying the weather data 14b distributed by the meteorological agency 14a with respect to an area including the driving route concerned to the weather model stored in the weather model DB 14d are sent through the API 12f and API 14h to the apparatus 10.

The sent information is sorted by link units in the traffic hindrance risk calculating unit 10a, thereafter sent from the traffic hindrance risk calculating unit 10a to the traffic hindrance risk predicting unit 10b, the map/indication table generating unit 10c and so on, and also sent to the mesh surface conversion processing unit 10e.

Congestion degree information generated by the traffic hindrance information generating server 12 and sent to the traffic hindrance risk calculating unit 10a is shown at the top of FIG. 4.

As shown, a "statistical congestion degree" is a past value (usual value) during a given time period, that is classified into one of three broad categories (multiple level categories): smooth, heavy and jammed. In contrast, a "current congestion degree" is a recent value (within less than past 30 min), and since it varies with driving time of day and other factors, it is differentiated (classified) into one of three categories, smooth, heavy and jammed, even in a smooth category of usually sparse traffic.

In their relation to the statistical congestion degrees, current congestion degrees are no different between the heavy traffic category in which traffic is usually heavy and the jammed category in which traffic is usually jammed. Current congestion degrees are therefore subdivided into nine categories relative to the three statistical congestion degree categories.

"Congestion degree information" is a generic term encompassing current congestion degree and statistical congestion degree, but concretely speaking congestion degree information comprising numerical values 1 to 9 defined regarding the current congestion degree categories within the three statistical congestion degree categories. As indicated, 1 to 3 mean current congestion degree of "jammed" within the associated statistical congestion degrees; namely, the value is defined as 1 when statistical congestion degree is jammed, as 2 when statistical congestion degree is heavy, and as 3 when statistical congestion degree is smooth.

Further, 4 to 6 mean current congestion degree of "heavy" within the associated statistical congestion degrees; namely, the value is defined as 4 when statistical congestion degree is jammed, as 5 when statistical congestion degree is heavy, and as 6 when statistical congestion degree is smooth.

Further, 7 to 9 mean current congestion degree of "smooth" within the associated statistical congestion degrees; namely, the value is defined as 7 when statistical congestion degree is jammed, as 8 when statistical congestion degree is heavy, and as 9 when statistical congestion degree is smooth.

Thus, congestion degree information sorted into multiple levels, specifically current congestion degree sorted into nine categories with respect to statistical congestion degree sorted into three categories, is in the foregoing manner sorted (classified) into multiple (nine) level categories of congestion degree information and assigned numerical values 1 to 9 that decrease with increasing congestion degree.

Moreover, the numerical values (congestion degree information) are indicated in the display 10g by colors defined to differ accordingly. Specifically, values 1 to 3 are colored red, values 4 to 6 orange, and values 7 to 9 green.

In addition, the colors are defined to vary in shade so as to become darker as degree of traffic hindrance (congestion degree) or extent of weather condition hindrance increases. Moreover, red, orange and green coloring is also applied to the driving route (links) in accordance with traffic hindrance (congestion degree) or extent of weather condition hindrance.

For convenience of illustration in the drawings, red coloring is indicated by dashed lines, orange coloring by one-dot-dashed lines and green coloring by two-dot-dashed lines, and shading of these colors is indicated by interval size of hatching lines of the line types corresponding to the colors (namely, darker color shading is indicated by narrower hatching line interval).

The traffic hindrance risk predicting unit 10b predicts traffic hindrance occurrence risk indicating possibility of traffic hindrance occurring on the driving route based on traffic information, more exactly traffic information and weather information, as shown in FIG. 4.

Weather condition risks are classified into broad categories of "strand risk," "traffic hindrance risk" and "possibility of traffic hindrance risk," with weather condition hindrance degree (severity) being deemed to decrease in this order. "Strand risk" refers especially to likelihood of the vehicle(s) 16 driving alone in sparse traffic having an accident, experiencing a disaster, getting stuck, or similar "Traffic hindrance risk" and "possibility of traffic hindrance risk" refer to danger of, for example, getting caught in extremely sluggish traffic or among many stranded vehicles under severe weather conditions (increased weather condition hindrance degree). In other words, traffic hindrance risk and the like mean danger attributable to both weather conditions and traffic hindrance. Between "Traffic hindrance risk" and "possibility of traffic hindrance risk," the former is defined as relating to higher degree of hindrance.

As shown in the drawings, weather conditions are of three types, snow, visibility and rain, whose risks are deemed to increase with increasing snowfall per unit time, increasing rainfall per unit time and decreasing visibility. Hindrance degree judged from foul weather information or foul weather information and traffic hindrance in combination is sorted into multiple level categories, C, B and A, by risk (rank value) in accordance with hindrance degree. Rank value is defined to indicate increasing hindrance degree in A, B and C order. In addition to the aforesaid, foul weather information also includes dense fog, strong wind and all other phenomena constituting traffic hindrances.

Figure 5:
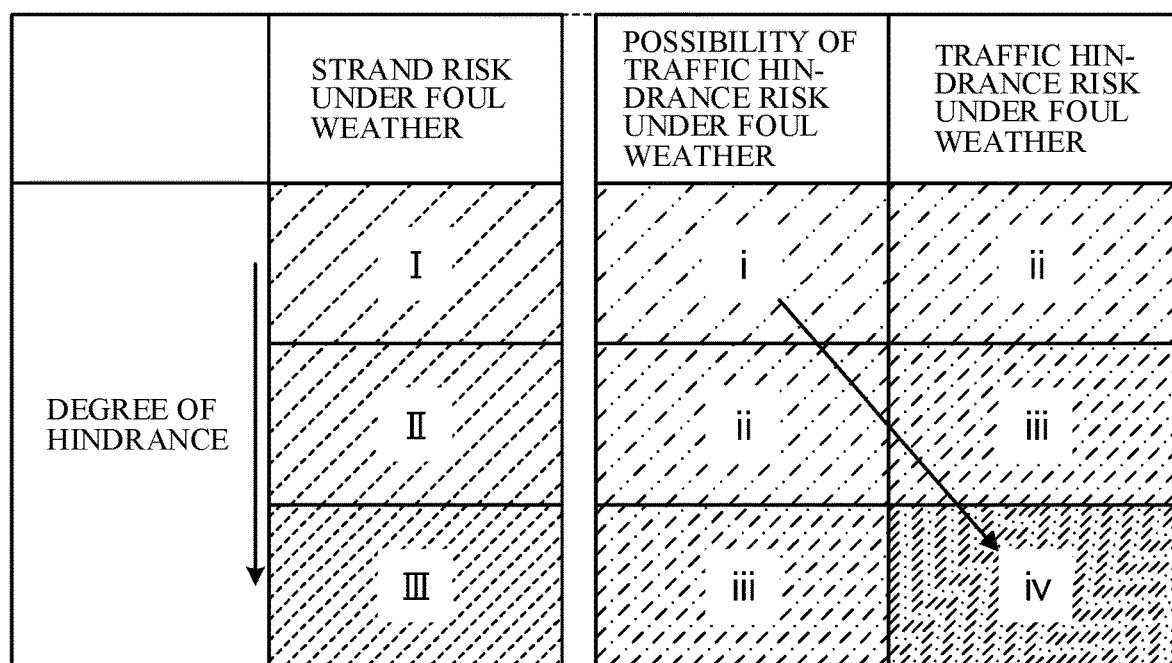
FIG. 5 is an explanatory diagram showing strand risk, traffic hindrance risk, and possibility of traffic hindrance risk of FIG. 4 in greater detail.

FIG. 5 is an explanatory diagram showing "strand risk," "traffic hindrance risk" and "possibility of traffic hindrance risk" of FIG. 4 in greater detail. In FIG. 5, instead of indicating risk using C, B and A, uppercase Roman numeral rank values I to III are used to indicate strand risk, and lowercase Roman numeral rank values i to iv are used to indicate traffic hindrance risk and the like.

As shown in FIG. 5, "strand risk," "traffic hindrance risk" and "possibility of traffic hindrance risk" are colored in colors defined in accordance with rank value. Specifically, risk values I to III (or A) are colored red similarly to the numerical values 1 to 3 of congestion degree information, risk values iii to iv (or B) are colored orange similarly to the numerical values 4 to 6 of congestion degree information, and risk values i to ii (or C) are colored green similarly to the numerical values 7 to 9 of congestion degree information.

As shown in the same drawing, similarly to the case of congestion degree information, the rank value coloring is defined to vary in shade so as to become darker as degree of traffic hindrance increases. Specifically, foul weather period hindrance risk and possibility thereof are defined, as indicated by a straight arrow, to increase with larger numerical value as degree of weatherwise hindrance increases with foul weather strand risk, as indicated by a slant arrow.

In addition, as shown in FIG. 6, when the weather information includes at least one item of foul weather information among snow, rain and visibility (snow in the illustrated example), the traffic hindrance risk calculating unit calculate and indicates a traffic hindrance occurrence risk predictive value indicating possibility of traffic hindrance occurring during a predetermined future period based on multiple categories (ranks 0 to 3) obtained by analyzing foul weather information and congestion degree information.

FIG. 6 shows an arrangement in which period up to 30 min from present time is considered current period, and traffic hindrance occurrence risk (more exactly, foul weather period traffic hindrance occurrence risk) up to 3 hr following current period (predetermined future period) is predicted every 10 min.

In FIG. 6, as also touched on above, degree of hindrance judged from congestion degree information and strand risk, traffic hindrance risk, and possibility of traffic hindrance risk is indicated by rank values of ranks 0 to 3. Rank 0 corresponds to case of no actual hindrance expected by 4 to 9 of congestion degree information or part of risk C with respect to hindrance degree, and ranks 1 to 3 correspond to risks C to A (or I to III or i to iv).

Figure 7:
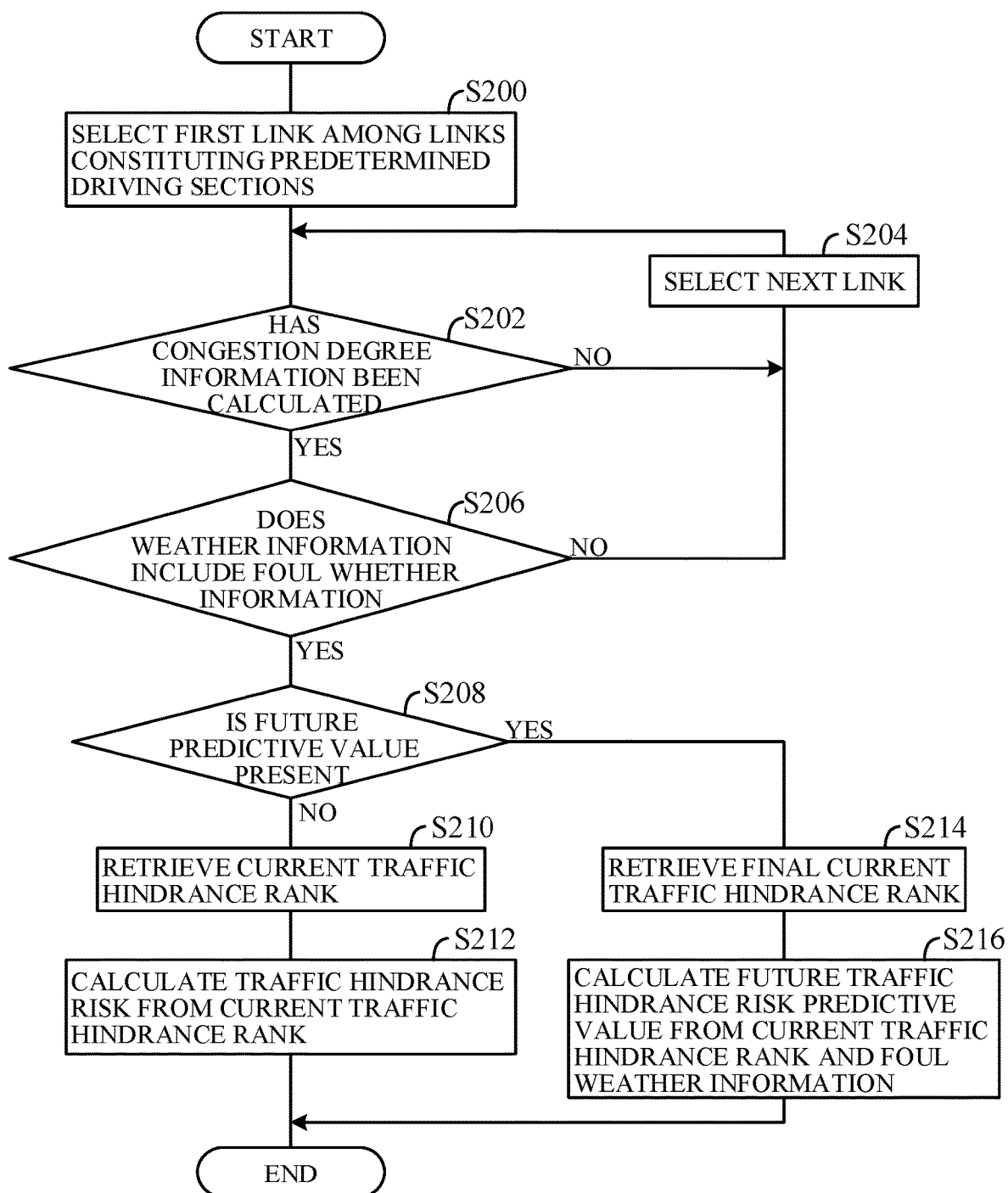
FIG. 7 is a flowchart for explaining operations (processing) shown in FIG. 6 of the traffic hindrance risk indication apparatus shown in FIG. 1.

FIG. 7 is a flowchart showing processing (operations) of the traffic hindrance risk predicting unit 10*b*.

Now to explain, in S200 a first link among links for which hindrance information is to be generated is retrieved. Specifically, the first link among links constituting predetermined driving sections (e.g., 10 km sections) is selected, whereafter the program goes to S202, in which it is determined whether congestion degree information has been calculated.

When the result in S202 is NO, the program goes to S204 to select the next link, and when YES, goes to S206, in which it is determined whether the weather information includes foul weather information containing any of snow, rain or visibility. When the result in S206 is NO, the program goes to S204, and when YES, goes to S208.

In the example shown in FIG. 6, the result of the determination of S206 is YES because snow information is present. Needless to say, the same would also apply in this case should foul weather information like that shown in FIG. 4 include all of snow, rain and visibility.

In S208, it is determined whether a future predictive value estimated from the weather model (value at time 10:40 or later of FIG. 6) is present, and when the result is NO, the program goes to S210, in which the current traffic hindrance rank is retrieved, namely, the current traffic hindrance rank at time of executing the flowchart of FIG. 7 is retrieved, whereafter the program goes to S212, in which (current) traffic hindrance risk is calculated or predicted (obtain calculation value) from the retrieved traffic hindrance rank.

On the other hand, when the result in S208 is YES, the program goes to S214, in which the current traffic hindrance rank is retrieved, namely, the final current traffic hindrance rank is retrieved, whereafter, the program goes to S216, in which a future traffic hindrance risk predictive value, namely one at time of executing the flowchart of FIG. 7, is calculated from the retrieved final current hindrance rank and foul weather information (snow information) corresponding to the detected traffic hindrance risk and time of executing the flowchart of FIG. 7, and the calculated predictive value is indicated.

Now follows an explanation of the processing (operations) of the mesh surface conversion processing unit 10*e* and the traffic hindrance risk indication data generating unit 10*f* of the apparatus 10 of FIG. 1.

Figure 8:
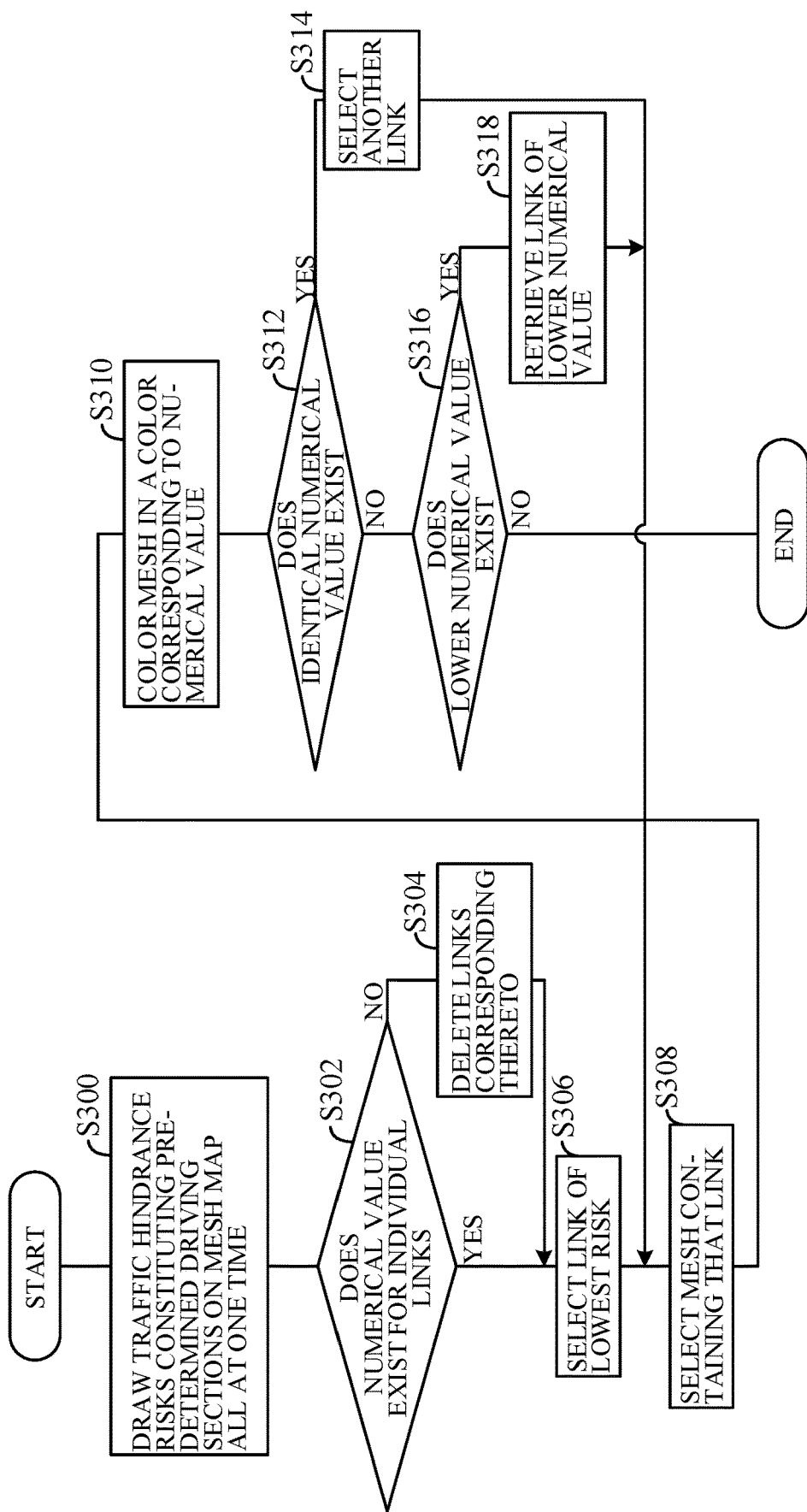
FIG. 8 is a flowchart for explaining, inter alia, mesh surface conversion processing (operations) of the traffic hindrance risk indication apparatus of FIG. 1.

FIG. 8 is a flowchart showing this processing, and FIGS. 9 to 12 are explanatory diagram explaining the processing of the FIG. 8 flowchart.

Now to explain with reference to FIG. 8, first, in S300, traffic hindrance risks calculated in link units are drawn on a mesh map. More specifically, as shown in FIG. 9, links constituting the aforesaid predetermined driving sections are drawn on the mesh map all at one time (all links are not shown in FIG. 9).

Next, in S302, it is determined whether a numerical value (indicating congestion degree information) exists for individual links of a predetermined area (area region including aforesaid predetermined driving sections).

These values are shown in FIG. 10. Although they are the same as those indicating congestion degree information shown in FIG. 4, in this example, 4, 7 and 8 are treated to be not colored because risk of traffic hindrance occurrence is considered low under the current circumstances, i.e., they are deemed categories whose congestion degrees are at or below a predetermined degree.

Figure 11:
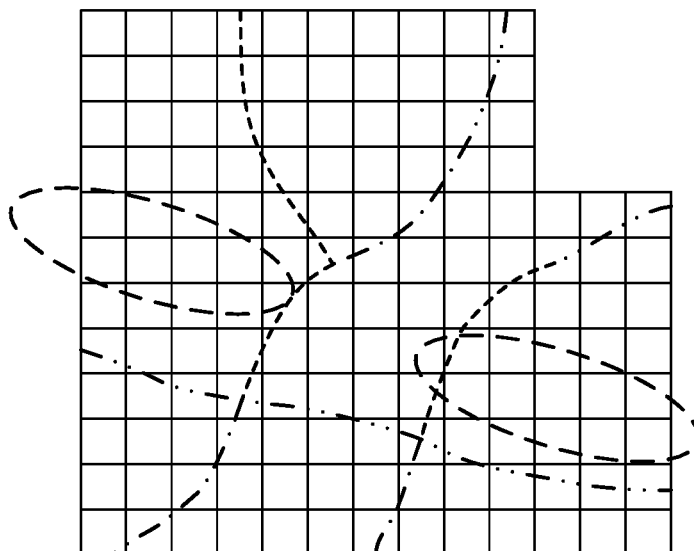
FIG. 11 is likewise a flowchart for explaining processing of the flowchart of FIG. 8.

Therefore, the result in S302 is NO regarding links having numerical values 4, 7 and 8, so, as shown in FIG. 11, the program goes to S304, in which the links corresponding to these are deleted and the remaining links are colored in colors corresponding to values 1, 2, 3, 5, 6, 8 and 9.

On the other hand, when the result in S302 is YES, the program goes to S306, in which the link of lowest risk, i.e., the link with largest numerical value, in FIG. 10, for instance, the link corresponding to numerical value 9, is selected, whereafter the program goes to S308, in which the mesh containing that link is selected, and to S310, in which the mesh is colored in a color corresponding to the numerical value.

Figure 12:
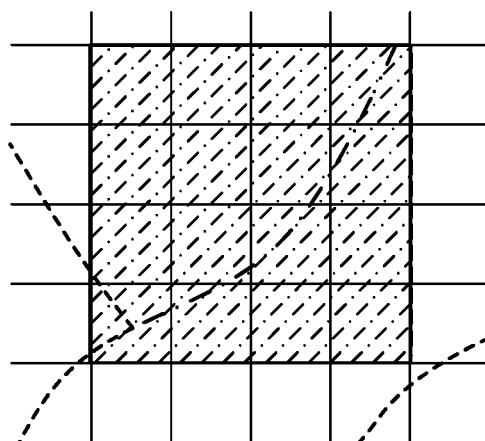
FIG. 12 is likewise a flowchart for explaining processing of the flowchart of FIG. 8.

Specifically, as shown in FIGS. 12 and 13, a region (square region) having as its summit a surface including the start point and end point of the link concerned is colored in a color corresponding to the numerical value.

Next, in S312, it is determined whether an identical numerical value exists, and when the result is YES, the program goes to S314 to select another link and then returns to S308. When the result in S312 is NO, the program goes to S316, in which it is determined whether a lower numerical value (6 in FIG. 10, for instance) exists, and when the result is YES, goes to S318 to retrieve that link.

The program next returns to S308 and repeats the aforesaid processing. When the result is NO in S316, further processing is terminated.

To explain in further detail, as seen in FIG. 13, when congestion degree information drawn with respect to the same link is overlaid by repeating the aforesaid processing, colors corresponding to numerical values of more severe congestion degrees posing greater traffic hindrance risk are written over colors corresponding to numerical values of milder congestion degrees posing slighter risk of traffic hindrance, whereby pinpoint indication of congestion degree becomes possible and enhanced viewability is obtained.

Thus, in accordance with the flowchart of FIG. 7, the traffic hindrance risk predicting unit 10*b* in the apparatus 10 predicts risk of traffic congestion occurrence (calculates predictive values) based on weather data, tubular data shown in FIGS. 4 to 6, tubular data generated by the processing of FIG. 8 and mesh format data shown in FIG. 13.

Further, the processing of FIG. 8 indicates the generated indication data shown in FIG. 13 on the display 10*g* so as to be viewable by the operator, whereby the operator is offered enhanced data visibility. As the operator can therefore concomitantly view traffic hindrance risk predictive values calculated by the processing of FIG. 7, the operator can accurately determine traffic hindrance degree.

There now follows an explanation of other processing (operations) of the mesh surface conversion processing unit 10*e* and the traffic hindrance risk indication data generating unit 10*f* of the apparatus 10 of FIG. 1, namely, of mesh surface conversion processing of indication data shown in FIGS. 4 and 5.

Figure 14:
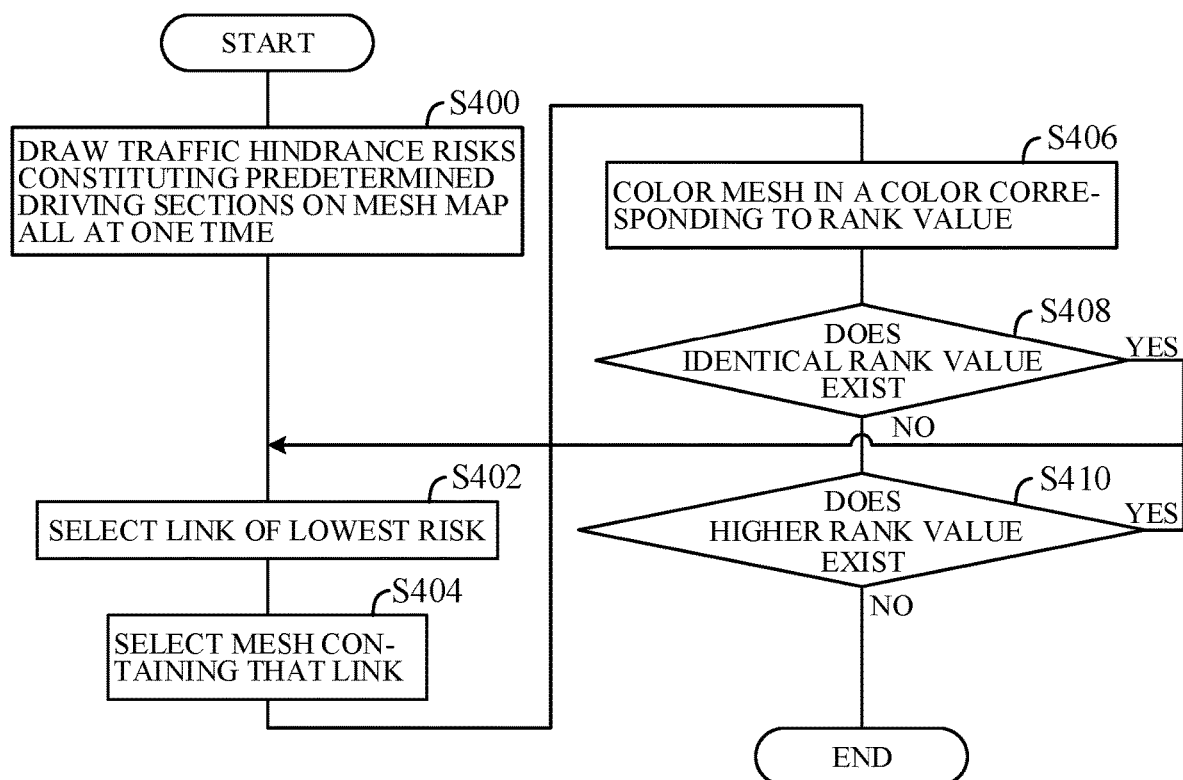
FIG. 14 is a flowchart for explaining, inter alia, other mesh surface conversion processing (operations) of the traffic hindrance risk indication apparatus of FIG. 1.

FIG. 14 is a flowchart showing this processing.

Now to explain with reference to this drawing, first, in S400, processing similar to that of S300 of FIG. 8 is performed to draw all links constituting predetermined driving sections on a mesh map at one time.

Next, in S402, the link of lowest risk, which in the example shown in FIG. 5 would be the link corresponding to Roman numeral i (rank value), for instance, is selected, whereafter the program goes to S404, in which the mesh containing that link is selected, and to S406, in which the mesh is colored in a color corresponding to the rank value. In the processing of FIG. 14, color data are generated only for "possibility of foul weather period hindrance risk" and "foul weather period hindrance risk" on right side of FIG. 5.

Next, in S408, it is determined whether an identical rank value exists, and the program returns to S402 when the result is YES. When the result in S408 is NO, the program goes to S410 to determine whether a higher rank value (ii in FIG. 5, for instance) exists. When the result in S410 is YES, the program returns to S402 to repeat the aforesaid processing, and when NO, terminates further processing.

When foul weather information and congestion degree information with respect to the same link are overlaid by repeating the aforesaid processing, similar to the processing at the FIG. 8 flowchart, colors corresponding to rank values of large traffic hindrance risk are overwritten by colors corresponding to larger rank values, whereby pinpoint indication of foul weather period congestion degree or possibility thereof becomes possible.

Tabular data of FIGS. 4 to 6 generated by the processing of FIG. 14 are indicated or displayed on the display 10*g* to be viewable by the operator. Therefore, by concomitantly viewing the traffic hindrance risk predictive values calculated by the processing of the FIG. 7 flowchart, the operator can accurately determine traffic hindrance degree.

As set forth above, the embodiment is configured to have an apparatus (10) or method for indicating a traffic hindrance risk, comprising: a traffic hindrance information generating server (s12, S10-S14, S100-S106) configured to generate traffic hindrance information for links that define a driving route on a mesh map, the traffic hindrance information encompassing congestion degree information including a current congestion degree obtained from a current value of driving data transmitted as probe data (20) regarding the driving route from a vehicle(s) (16) equipped with a navigation system (16*a*) and a statistical congestion degree obtained from a statistical value of the current value of driving data in a certain previous period, the congestion degree information being sorted into a plurality of level categories (specifically nine categories) in accordance with a driving speed in the driving data; a weather information generating server (14) configured to generate weather information from weather data (including weather observation values, weather analysis values, and weather forecast values) distributed by a meteorological agency (14*a*) with respect to an area including the driving route based on an weather model; a data generating unit (first traffic hindrance risk indication data generating unit 10*d*, mesh surface conversion processing unit 10*e*, second traffic hindrance risk indication data generating unit, display 10*g*, S400-S410, processing shown in FIGS. 4 and 5) configured to generate a tabular data together with the congestion degree information sorted into the plurality of level categories by sorting, when the weather information includes at least one item of foul weather information among snow, rain and visibility, the foul weather information into a plurality of level categories (rank values i to iv) in accordance with a degree of traffic hindrance; and a traffic hindrance risk calculating unit (traffic hindrance risk predicting unit 10*b*, first and second traffic hindrance risk indication data generating unit 10*d*, 10*f*, display 10*g*, S200-S216) configured to calculate a traffic hindrance occurrence risk predictive value meaning possibility of traffic hindrance occurrence with respect to the driving route for a predetermined future period (e.g., three hours) based on the data generated by the data generating unit and indicate the traffic hindrance occurrence risk predictive value to be viewed by an operator of the vehicle, or the apparatus 10 is configured to have an electronic control unit at least one processor and a memory coupled to the processor (specifically one or more processor each equipped with a CPU, ROM, RAM, I/O and the like); wherein the processor and the memory are configured to perform, or the method comprising the steps of generating a tabular data together with the congestion degree information sorted into the plurality of level categories by sorting, when the weather information includes at least one item of foul weather information among snow, rain and visibility, the foul weather information into a plurality of level categories (rank values i to iv) in accordance with a degree of traffic hindrance (S400-S410); and calculating a traffic hindrance occurrence risk predictive value meaning possibility of traffic hindrance occurrence with respect to the driving route for a predetermined future period (e.g., three hours) based on the generated data and indicate the traffic hindrance occurrence risk predictive value to be viewed by an operator of the vehicle (S200-S216).

With this, visibility can be enhanced by enabling visual observation of predictive values of traffic hindrance risks that may be impending in light of traffic conditions and weather condition based on the traffic hindrance occurrence risk predictive value meaning possibility of traffic hindrance occurrence with respect to the driving route for a predetermined future period.

In the apparatus or method, the data generating unit (or the step of generating) is configured to generate (or the processor and the memory are configured to perform the generating by generating) the tubular data by coloring the foul weather information and the congestion degree information sorted into the plurality of level categories in colors defined in accordance with rank values (rank values i to iv) that are defined to increase with increasing hindrance degree (S400-S410).

With this, visibility can further be enhanced, by generating the tubular data by coloring the foul weather information and the congestion degree information sorted into the plurality of level categories in colors defined in accordance with rank values that are defined to increase with increasing hindrance degree.

In the apparatus or method, the data generating unit (or the step of generating) is configured to write (or the processor and the memory are configured to perform the generating by writing), when the foul weather information and the congestion degree information are to be overlapped on a same link, a color of the congestion degree information whose rank value is a first value over a color of the congestion degree information whose rank value is less than the first value (S408, S410, S402, S404).

With this, visibility can further be enhanced.

In the apparatus or method, the traffic hindrance information generating server is configured to generate the traffic hindrance information for each of the links that define the driving route, and the traffic hindrance risk calculating unit (the step of calculating) is configured to calculate (or the processor and the memory are configured to perform the calculating by calculating the traffic hindrance occurrence risk predictive value based on the congestion degree information (S200-S216).

With this, visibility can be additionally enhanced by displaying predictive values of risks calculated based on congestion degree information generated for every link individually.

In the apparatus or method, the data generating unit (or the step of generating) is configured to discontinue (or the processor and the memory is configured to perform the generating by discontinuing) coloring the congestion degree information in the color assigned in accordance with the numerical value, when the congestion degree is equal to or less than a predetermined degree (S302-S304).

With this, in addition to the aforesaid effects and advantages, processing load can be reduced.

In the apparatus or method, the traffic hindrance information generating server is configured to generate the congestion degree information for individual predetermined areas (e.g., 10 km square).

With this, in addition to the aforesaid effects and advantages, data required for, inter alia, calculating and displaying predictive values can be reliably generated.

It should be noted that, although this specification states that the traffic hindrance information, including congestion degree information composed of current congestion degrees and statistical congestion degrees obtained from statistical values, is generated by the hindrance information generating server 12, such information can alternatively be generated by the apparatus 10.

While the present invention has been described with reference to the preferred embodiments thereof, it will be understood, by those skilled in the art, that various changes and modifications may be made thereto without departing from the scope of the appended claims.

What is claimed is:

1. An apparatus, comprising:
   a traffic hindrance information generating server installed at a first predetermined location and configured to generate traffic hindrance information for links that define a driving route on a mesh map, wherein
   the traffic hindrance information encompassing congestion degree information including a current congestion degree obtained from a current value of driving data transmitted as probe data regarding the driving route from each of vehicles equipped with a telematics-based drive support system and a statistical congestion degree obtained from a statistical value of the current value of the driving data in a certain previous period, the congestion degree information being sorted into a plurality of level categories in accordance with a driving speed in the driving data;
   a weather information generating server installed at a second predetermined location and configured to generate weather information from weather data distributed by a meteorological agency with respect to an area including the driving route where each of the vehicles run based on an weather model; and
   a traffic hindrance risk indication apparatus comprising
      a data generating unit configured to generate a tabular data together with the congestion degree information sorted into the plurality of level categories by sorting, when the weather information with respect to the driving route where each of the vehicles runs includes at least one item of foul weather information among snow, rain and visibility, the foul weather information into a plurality of level categories in accordance with a degree of traffic hindrance, and
      a traffic hindrance risk calculating unit configured to calculate a traffic hindrance occurrence risk predictive value meaning possibility of traffic hindrance occurrence with respect to the driving route where each of the vehicles runs for a predetermined future period based on the data generated by the data generating unit and indicate the traffic hindrance occurrence risk predictive value to be viewed by an operator of each of the vehicles, wherein
   the traffic hindrance risk indication apparatus is installed on each of the vehicles equipped with the telematics-based drive support system, equipped with a position sensor, and configured to transmit driving data as probe data regarding a driving route on which each of the vehicles runs, and the traffic hindrance risk indicating apparatus is configured to be connected to the weather information generating server and the traffic hindrance information generating server.

2. The apparatus according to claim 1, wherein the data generating unit is configured to generate the tubular data by coloring the foul weather information and the congestion degree information sorted into the plurality of level categories in colors defined in accordance with rank values that are defined to increase with increasing hindrance degree.

3. The apparatus according to claim 2, wherein the data generating unit is configured to write, when the foul weather information and the congestion degree information are to be overlapped on a same link, a color of the congestion degree information whose rank value is a first value over a color of the congestion degree information whose rank value is less than the first value.

4. The apparatus according to claim 2, wherein the traffic hindrance information generating server is configured to generate the traffic hindrance information for each of the links that define the driving route, and the traffic hindrance risk calculating unit is configured to calculate the traffic hindrance occurrence risk predictive value based on the congestion degree information.

5. The apparatus according to claim 2, wherein the data generating unit is configured to discontinue coloring the congestion degree information in the color assigned in accordance with the numerical value, when the congestion degree is equal to or less than a predetermined degree.

6. The apparatus according to claim 1, wherein the traffic hindrance information generating server is configured to generate the congestion degree information for individual predetermined areas.

7. An apparatus, comprising:
a traffic hindrance information generating server installed at a first predetermined location and configured to generate traffic hindrance information for links that define a driving route on a mesh map, wherein
the traffic hindrance information encompassing congestion degree information including a current congestion degree obtained from a current value of driving data transmitted as probe data regarding the driving route from each of vehicles equipped with a telematics-based drive support system and a statistical congestion degree obtained from a statistical value of the current value of the driving data in a certain previous period, the congestion degree information being sorted into a plurality of level categories in accordance with a driving speed in the driving data;
a weather information generating server installed at a second predetermined location and configured to generate weather information from weather data distributed by a meteorological agency with respect to an area including the driving route where each of the vehicles runs based on an weather model; and
a traffic hindrance risk indication apparatus comprising
at least one processor; and
a memory coupled to the processor, wherein the processor and the memory are configured to perform
generating a tabular data together with the congestion degree information sorted into the plurality of level categories by sorting, when the weather information with respect to a driving route where each of the vehicles runs includes at least one item of foul weather information among snow, rain and visibility, the foul weather information into a plurality of level categories in accordance with a degree of traffic hindrance; and
calculating a traffic hindrance occurrence risk predictive value meaning possibility of traffic hindrance occurrence with respect to the driving route where each of the vehicles runs for a predetermined future period based on the generated data and indicating the traffic hindrance occurrence risk predictive value to be viewed by an operator of each of the vehicles, wherein
the traffic hindrance risk indication apparatus is installed on each of the vehicles equipped with a telematics-based drive support system, equipped with a position sensor, and configured to transmit driving data as probe data regarding a driving route on which each of the vehicles runs, and the traffic hindrance risk indicating apparatus is configured to be connected to the weather information generating server and the traffic hindrance information generating server.

8. The apparatus according to claim 7, wherein the processor and the memory are configured to perform the generating by generating the tubular data by coloring the foul weather information and the congestion degree information sorted into the plurality of level categories in colors defined in accordance with rank values that are defined to increase with increasing hindrance degree.

9. The apparatus according to claim 8, wherein the processor and the memory are configured to perform the generating by writing, when the foul weather information and the congestion degree information are to be overlapped on a same link, a color of the congestion degree information whose rank value is a first value over a color of the congestion degree information whose rank value is less than the first value.

10. The apparatus according to claim 8, wherein the traffic hindrance information generating server is configured to generate the traffic hindrance information for each of the links that define the driving route, and the processor and the memory are configured to perform the calculating by calculating the traffic hindrance occurrence risk predictive value based on the congestion degree information.

11. The apparatus according to claim 8, wherein the processor and the memory are configured to perform the generating by discontinuing coloring the congestion degree information in the color assigned in accordance with the numerical value, when the congestion degree is equal to or less than a predetermined degree.

12. The apparatus according to claim 7, wherein the traffic hindrance information generating server is configured to generate the congestion degree information for individual predetermined areas.

13. A method wherein
a traffic hindrance risk indication apparatus installed on each of vehicles equipped with a telematics-based drive support system, equipped with a position sensor, and configured to transmit driving data as probe data regarding a driving route on which each of the vehicles runs, and the traffic hindrance risk indicating apparatus is configured to be connected to a weather information generating server and a traffic hindrance information generating server,
the traffic hindrance information generating server installed at a first predetermined location and configured to generate traffic hindrance information for links that define the driving route on a mesh map, wherein
the traffic hindrance information encompassing congestion degree information including a current congestion degree obtained from a current value of the driving data transmitted as the probe data regarding the driving route from each of the vehicles equipped with the drive support system and a statistical congestion degree obtained from a statistical value of the current value of the driving data in a certain previous period, the congestion degree information being sorted into a plurality of level categories in accordance with a driving speed in the driving data; and
the weather information generating server installed at a predetermined location and configured to generate weather information from weather data distributed by a meteorological agency with respect to an area including the driving route where each of the vehicles runs based on an weather model;
wherein the method comprises:
generating a tabular data together with the congestion degree information sorted into the plurality of level categories by sorting, when the weather information with respect to the driving route where each of the vehicles runs includes at least one item of foul weather information among snow, rain and visibility, the foul weather information into a plurality of level categories in accordance with a degree of traffic hindrance; and calculating a traffic hindrance occurrence risk predictive value meaning possibility of traffic hindrance occurrence with respect to the driving route where each of the vehicles runs for a predetermined future period based on the generated data and indicating the traffic hindrance occurrence risk predictive value to be viewed by an operator of each of the vehicles.

14. The method according to claim 13, wherein the generating is configured to generate the tubular data by coloring the foul weather information and the congestion degree information sorted into the plurality of level categories in colors defined in accordance with rank values that are defined to increase with increasing hindrance degree.

15. The method according to claim 14, wherein the generating is further configured to write, when the foul weather information and the congestion degree information are to be overlapped on a same link, a color of the congestion degree information whose rank value is a first value over a color of the congestion degree information whose rank value is less than the first value.

16. The method according to claim 14, wherein the traffic hindrance information generating server is configured to generate the traffic hindrance information for each of the links that define the driving route, and of calculating is configured to calculate the traffic hindrance occurrence risk predictive value based on the congestion degree information.

17. The method according to claim 14, wherein the generating is further configured to discontinue coloring the congestion degree information in the color assigned in accordance with the numerical value, when the congestion degree is equal to or less than a predetermined degree.

18. The method according to claim 13, wherein the traffic hindrance information generating server is configured to generate the congestion degree information for individual predetermined areas.

* * * * *